Figure 1:
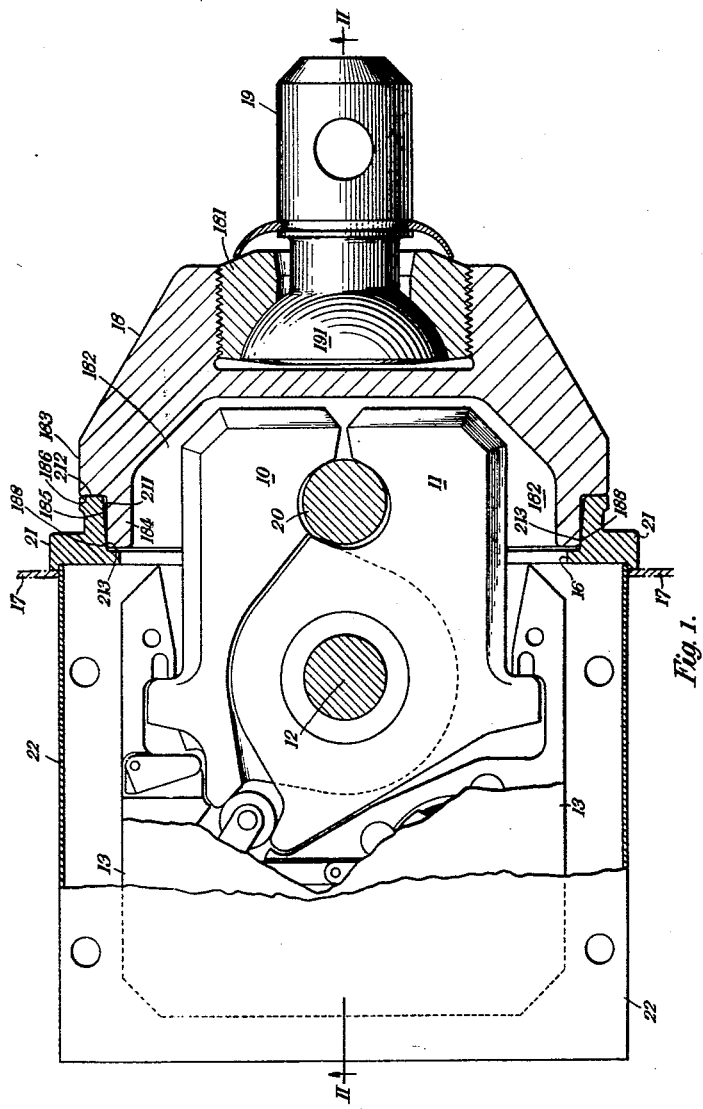

Oct. 11, 1960 R. A. FIRMAN 2,955,866
RELEASABLE ATTACHMENTS
Filed Jan. 15, 1957 2 Sheets-Sheet 1

INVENTOR
REGINALD A. FIRMAN
BY
Watson, Cole, Grindle & Watson
ATTORNEYS

Oct. 11, 1960 R. A. FIRMAN 2,955,866
RELEASABLE ATTACHMENTS
Filed Jan. 15, 1957 2 Sheets-Sheet 2
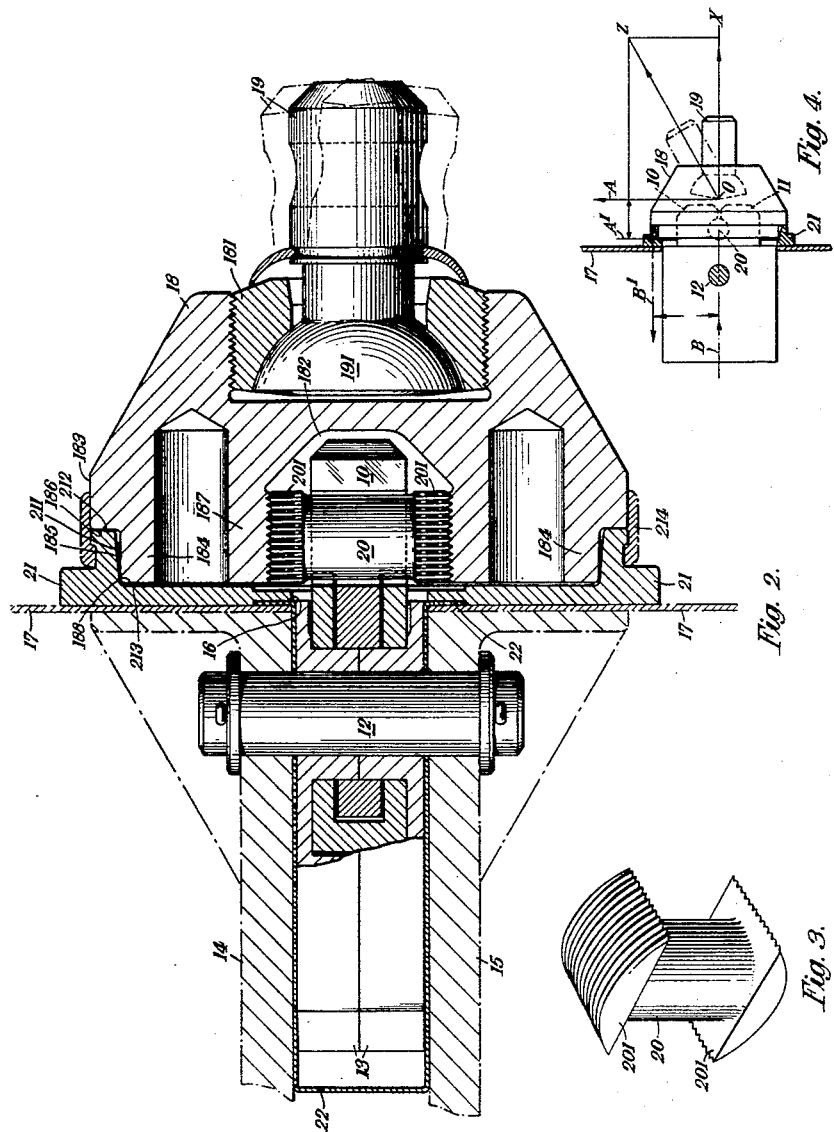
INVENTOR
REGINALD A. FIRMAN
By
Watson, Cole, Grindle & Watson
ATTORNEYS

2,955,866

RELEASABLE ATTACHMENTS

Reginald Arthur Firman, Weybridge, England, assignor to Vickers-Armstrongs (Aircraft) Limited, London, England, a British company Filed Jan. 15, 1957, Ser. No. 634,335

Claims priority, application Great Britain Jan. 16, 1956

3 Claims. (Cl. 294—83)

The invention is concerned with releasable attachments such as that which forms the subject of United States Patent No. 2,548,053, which are commonly employed for the release of bombs and the like, tail-parachute aircraft brakes and target-towing installations. In certain circumstances the force exerted upon the hooks of the release mechanism at the instant of release may act in a direction which is not that most advantageous to a clean, undelayed separation; in some extreme cases indeed such force may act even to jam the hooks by causing them to bind upon their pivots so that they are prevented from opening and the load remains atttached. The object of this invention is to provide for use in conjunction with a releasable attachment such as that referred to means whereby, irrespective of the direction of the force due to the load at the instant of release, the only force which is re-acted by the release mechanism is in the desired direction and a clean separation of the hooks is thereby assured.

The invention accordingly provides a housing adapted for attachment to a supporting structure and comprising a shear-reacting member which is arranged to provide for the attached object separate abutments so located that an out-of-line force due to the load is reacted by couples of which the shear and compression components are absorbed by the fixed structure whilst the tension component acts in the appropriate direction to separate the hooks of the attachment.

The said abutment member may conveniently take the form of an annulus adapted to mate with a circular-section head which is a part of the object to be released. Said annulus may be formed with an internal taper which, when said head is presented to the attachment for initial connection thereto, serves automatically to centre the head in correct axial alignment with the release mechanism. Further, the annulus may serve to shroud the temporary joint between the attachment structure and the head, thereby facilitating the protection of the release mechanism against the ingress of moisture for weather-proofing purposes.

The manner in which is the invention may be carried into effect is hereinafter described with reference to the accompanying drawings which illustrate an embodiment of the invention as applied to a releasable attachment for connection of a landing brake parachute to the tail of an aeroplane. In said drawings Fig. 1 is a partly sectional longitudinal elevation of the attachment and its associated parts, Fig. 2 is a longitudinal section taken on the line II—II of Fig. 1, Fig. 3 is a perspective detail of the link-bar, and Fig. 4 is a diagram illustrating the resolution of a desaxial force applied to the parachute connection.

The releasable attachment mechanism used in this embodiment is substantially such as that described in United States Patent No. 2,548,053. It comprises a pair of hooks 10, 11 mounted for pivotal movement on a pin 12 and enclosed in a case 13, the case 13 being housed between two spaced members 14, 15 of the after part of the airframe. The hooks 10, 11 extend rearwardly through an aperture 16 in a shear bulkhead 17 forming a rigid part of the airframe structure, the arrangement being such that the optimum direction of the force due to a load sustained by the hooks will act in the plane of their rotation and along a line midway between them.

The releasable nature of the hooks 10 and 11 will be clearly understood from the disclosure in Figure 1 of the drawings taken in connection with the Pierson Patent 2,548,053 already mentioned. By suitable actuating mechanism disclosed in that patent the arm 67 may be retracted thus withdrawing the roller 66 from between the faces 621 and 631 of the shank ends of the hook members 11 and 10 respectively, which of course will permit the hooks to open to released position.

A coupling member in the form of a block 18 of circular section (hereinafter referred to as the "head") is fixed to the parachute assembly (not shown) by means of a coupling element 19 and a universal joint constituted by a hemispherical enlargement 191 of the member 19 and a conformably shaped socket 181 located axially in the head. On the side thereof remote from the universal joint, the head 18 is formed with a cavity 182 which is spanned by a transversely disposed bar 20 which serves to establish a link between the head 18 and the hooks 10, 11 of the attachment. As will be seen from the drawings, the link bar 20 is embraced by said hooks in their closed position. The cylindrical portion 183 of the head, which surrounds said cavity 182, terminates in an annular spigot 184, the circumferential face of which is designated 185.

The link bar 20 is shown separately in Fig. 3. At each extremity it is provided with a part 201 of arcuate cross-section, the outer surface of which is screw-threaded to engage a female screw-thread tapped in the recessed central part 187 of the head 18.

Fixed to the aforesaid bulkhead 17 is a housing 22 shaped internally so as to be adapted to receive the casing 13 of the release mechanism, and terminating at its open end in a coupling element in the form of a metal ring 21 which is formed with an internally tapered recess 211 adapted to mate with the spigot 184 of the head 18. The outer face 212 of the ring 21, which abuts against the shoulder 186 of the head, is approximately co-planar with the axis of the link bar 20 when the latter is engaged by the hooks 10, 11, and the arrangement is such that should the direction of the force due to the load represented by the line OZ in Fig. 4, at the instant of release be out of alignment with the optimum direction represented by the line OX, the force OZ will be resolved into two components OX and OA, OX being in the desired direction and OA at right angles to it. The force OA produces couples $AA^1$ and $BB^1$, $AA^1$ being a shear force reacted at the abutments 188 and 213 of the ring and head respectively instead of the hook jaws 10, 11 and bar 20, whilst $BB^1$ is a compression force reacted by the abutments 186 and 212.

The mating surfaces 185, 211 of the head and the abutment ring serve to ensure the co-axial alignment of these parts when the former is presented to the latter at the initial attachment of the parachute assembly.

If desired, the attachment may be rendered weather-proof, by the provision of an india rubber or like flexible seal 214 furnished for the joint between the shroud and the head.

It will be understood that whereas in the embodiment hereinbefore described the abutment member of the housing and the cooperating member of the head are respectively of female and male formation, the shapes of these members may be reversed in an alternative construction.

What I claim as my invention and desire to secure by Letters Patent is:

1. A releasable coupling device for connecting two bodies subject to tensile forces tending to separate them, said device comprising two cooperating axially aligned coupling members, the first of said coupling members being fixed with relation to one of said bodies and the second mating coupling member having means connecting it to the other of said bodies and subject to out-of-line separating forces acting at an angle to the common axis of the coupling members; cooperating releasable gripping elements comprised in the respective coupling members and disposed substantially axially thereof and requiring an approximately axial tensile force applied to them for effecting prompt clean separation of the members; and in combination therewith a shear-reacting member rigidly fixed on the body carrying the first couping member and separately and independently of the first coupling member, said shear-reacting member providing shear- and compression-abutment points, said shear-reacting member being an annular abutment member having a recess coaxial with said axis; a circular-section head on the second coupling member disposed to be received in said recess, said out-of-line force being reacted by couples of which the shear and compression components are transmitted by the head on the second coupling member to the shear and compression abutment points of said annular abutment, and thus substantially the only force applied to the gripping elements is the tension component, which acts in a substantially axial direction to separate said elements, and the annular abutment and the head of the second coupling member contacting each other along shear and compression abutment faces defining said respective shear and compression abutment points, which faces are respectively disposed at right angles to each other.

2. The coupling device as set forth in claim 1 in which the inner walls of the annular abutment structure are of outwardly diverging frusto-conical configuration to more effectively center the head of the second coupling member when applied.

3. The coupling device as set forth in claim 1 in which the gripping element of the first coupling member comprises hooks; the head of the second coupling member carries a link bar which, when the face of the head is received by said annular abutment member, is engaged by said hooks; the center of the link bar comprising substantially the point of engagement, and the projecting face of the annular abutment structure constituting said compression abutment points, which are substantially co-planar with the point of attachment.

References Cited in the file of this patent

UNITED STATES PATENTS

| | | |
|---|---|---|
| 1,782,134 | Coplan | Nov. 18, 1930 |
| 2,350,999 | Beirise | June 13, 1944 |
| 2,723,876 | Langlois et al. | Nov. 15, 1955 |
| 2,784,987 | Corcoran | Mar. 12, 1957 |

FOREIGN PATENTS

| | | |
|---|---|---|
| 576,922 | Great Britain | Apr. 26, 1946 |